United States Patent [19]

Lowe

[11] Patent Number: 5,179,483
[45] Date of Patent: Jan. 12, 1993

[54] METHOD FOR CONTROLLING AIRFLOW THROUGH A DISC FILE SPINDLE

[75] Inventor: Anthony C. Lowe, Braishfield, England

[73] Assignee: International Business Machines Corporation, Armonk, N.Y.

[21] Appl. No.: 677,064

[22] Filed: Mar. 29, 1991

[30] Foreign Application Priority Data

Apr. 2, 1990 [EP] European Pat. Off. ........ 90303522.8

[51] Int. Cl.⁵ ............................................. G11B 33/14
[52] U.S. Cl. ............................... 360/97.02; 360/97.03
[58] Field of Search .............. 360/98.07, 99.08, 97.02, 360/97.03, 98.01, 98.02

[56] References Cited

U.S. PATENT DOCUMENTS

| | | | |
|---|---|---|---|
| 4,471,395 | 9/1984 | Beck | 360/98.04 |
| 4,562,499 | 12/1985 | Mizoshita | 360/97.03 |
| 4,626,941 | 12/1986 | Sawada | 360/98.02 X |
| 5,012,359 | 4/1991 | Kohno | 360/98.07 X |

FOREIGN PATENT DOCUMENTS 0263932 7/1987 European Pat. Off. .

OTHER PUBLICATIONS

IBM Technical Disclosure Bulletin, vol. 26, No. 11, Apr. 1984, "Spindle Seal for Self-Pressurized Head/Disk Assembly" by R. A. Davis and S. K. Moss.

*Primary Examiner*—A. J. Heinz
*Attorney, Agent, or Firm*—Richard E. Billion

[57] ABSTRACT

A disk file is presented, having a container (3) for a hub assembly(6) including a stationary spindle (9) attached to the container; a clamp (13) for mounting a disk (11) on a hub (8); bearing means (14, 15), comprising a first bearing (14) located towards one end of the hub (8) and a second bearing (15) located towards the other, for rotatably mounting the hub (8) on the spindle (9); characterized in that the hub assembly (6) further comprises ventilation means (21, 22, 23) for directing an air flow into the hub assembly (6) through the bearing means (14, 15) and out of the hub assembly (6) into the container (3) through a connecting air passage (21) located in the spindle (9) permitting the air to flow through a filter (25). The ventilation means comprises a ventilated spindle (20) having first ventilation ducts (22) extending from the hub assembly into the air passage, and second ventilation ducts (23) extending from the air passage into the container.

15 Claims, 4 Drawing Sheets

METHOD FOR CONTROLLING AIRFLOW THROUGH A DISC FILE SPINDLE

The present invention relates to a disk file; and more specifically to preventing contaminants from entering the vicinity of storage disks contained in a sealed disk file.

Magnetic recording disk files commonly comprise one or more storage disks from which data are accessed by magnetic read/write heads. The disks are mounted on a common hub which, in turn, is rotatably mounted on a spindle. A thin cushion of air supports the heads above the disks. The air cushion is generated by high speed rotation of the disks under the heads. Because of the low flying height of the heads above the disk surfaces, any small particles free to move into the airspace between the head and the disk (head/disc area) can cause the head to crash thereby damaging the head, disk, and any data stored on the disk. A filtration system is therefore included in many disk files to reduce the potential for such damage to occur. A sealed disk file assembly operates in a substantially sealed enclosure in contrast to other types of disk file wherein air is pumped through the enclosure from an external, filtered source. In a sealed disk file, rotation of the disks can pump the enclosed air in continuous circulation.

A problem particularly associated with sealed disk files comprising a fixed spindle mounting for an in-hub motor, is the generation of airborne contaminants by rotation of the hub assembly. These contaminants include particles and organic vapours which can be detrimental to the reliability of the disk file. Any pressure difference generated between the top and bottom of the disk container during operation of the file can cause a net air flow through the hub assembly which transports the contaminants into the disk container. Where no such pressure difference exists, it is also possible for the contaminants to enter the disk container by diffusion.

One approach to preventing contaminants from passing through the hub assembly and into the disk container is described in an article entitled "Spindle Seal for a Self-Pressurised head/disk assembly" (IBM Technical Disclosure Bulletin Vol 26, No 11, April 1984 pp6001-6002)". This technique uses filtered air from an external source to rise the region between upper and lower bearing assemblies in the hub of a sealed disk file. The pressure difference is arranged to direct air flowing through the bearings away from the the disk container. A disadvantage with using this technique is that an external air pump is required. Another disadvantage is that introducing additional air ways to the disk container adds complexity.

EP-A 263 932 describes a filter, for a sealed disk file, including a filter in the form of a washer fitting over a bearing race supporting a spindle onto which mounts a hub carrying a stack of disks. The bearing is open to the atmosphere. The combination of the bearing race and the filter thus constitutes a balancing filter. A problem with this arrangement is that a pressure difference from the top to the bottom of the hub assembly, generated when the hub rotates, can cause contaminants to flow through the disk container before reaching the filter.

The aim of the present invention is therefore to reduce the quantity of airborne contaminants produced within the hub assembly from entering the disk container.

According to the present invention, there is now provided a disk file having a container for a hub assembly including a stationary spindle attached to the container; a clamp for mounting a disk on a hub; bearing means, comprising a first bearing located towards one end of the hub and a second bearing located towards the other, for rotatably mounting the hub on the spindle; characterised in that the hub assembly comprises ventilation means for directing an air flow into the hub assembly through the bearing means and out of the hub assembly into the container through a connecting air passage located in the spindle permitting the air to flow through a filter.

The advantage with this arrangement is that it prevents contaminants from the hub assembly entering the disk container, either by diffusion or in an air current. The air passage which is essential to the present invention can be easily machined into the spindle. Such modification of an existing component of the disk file, therefore does not further complicate the process of assembling the disk file.

Specific embodiments of the present invention will now be described with reference to the following drawings in which.

Figure 1:
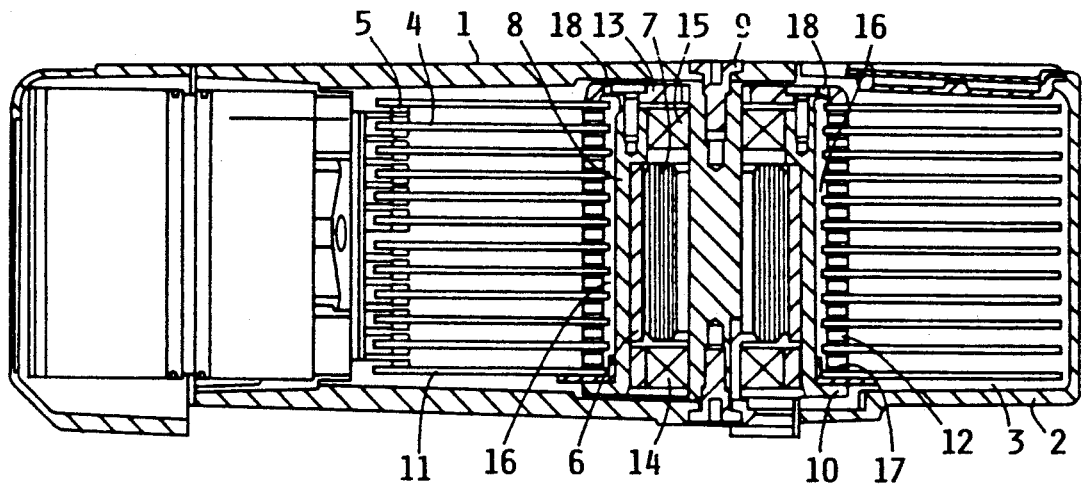
FIG. 1 is a cross sectional view of a sealed disk file of the prior art.

An example of a sealed disk file of the prior art relates is shown in FIG. 1. The sealed disk file comprises a disk cover 1 and an end cover 2 which fit together to constitute a substantially sealed disk container 3. The disk container contains a stack of magnetic recording disks 4 and a corresponding array of read/write heads 5. A hub assembly 6 comprises a motor 7 which drives a rotary hub 8 around a stationary spindle 9 which is fixed to the disk compartment cover. The hub has a lower rim 10 which supports the lower most disk 11 in the stack. Each disk on the hub is separated from adjacent disks by an annular disk spacer 17. The disk stack is axially constrained by a clamp 13 mounted on the hub. The hub assembly is mounted on the stationary spindle via a lower bearing 14 and an upper bearing 15.

During normal operation, the rotating disk stack acts as a laminar flow fan which induces an air flow through ventilation holes 18 in the clamp and into a cylindrical space 16 between the inner diameter of the disks and the outside of the hub. Perforations 12 in the spacers direct the air flow across the disks and back into the enclosure. Since the ventilation holes are located at the top of the disk stack, and the air flows through the cylindrical space towards the bottom of the disk stack, a residual pressure difference is established between the upper bearing and the lower bearing of the hub assembly.

Figure 2:
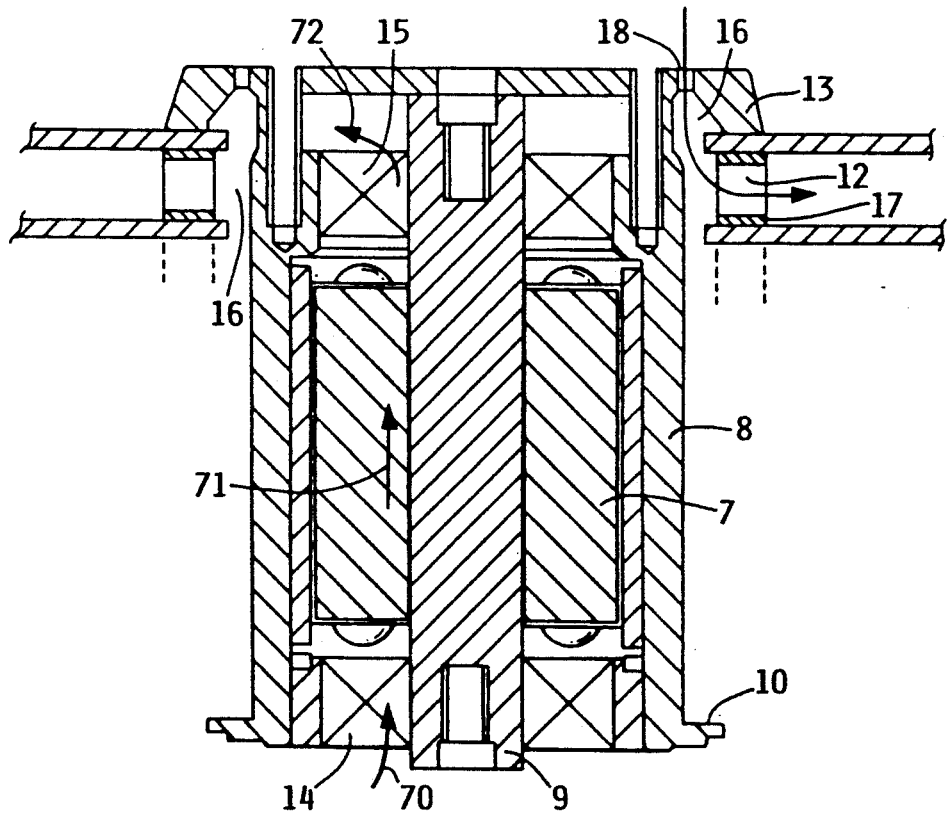
FIG. 2 is a cross sectional view of a hub assembly which is part of the sealed disk file of the prior art.

FIG. 2 shows an expanded cross sectional view of a hub assembly which is part of the sealed disk file of the prior art. With reference to FIG. 2, the residual pressure difference causes air from the disk container to be drawn into the hub assembly through the lower bearing. Air inside the hub assembly is accordingly drawn up through the motor and expelled back into the disk container through the upper bearing. Air flowing from the hub assembly 6 to the disk container can thus become contaminated by bearing particles from both the upper bearing 15 and the lower bearing 14; and vapours. Air flows through the lower bearing 14, the hub assembly 6, and the upper bearing 15 are indicated by arrows 70, 71, and 72 respectively.

Figure 3:
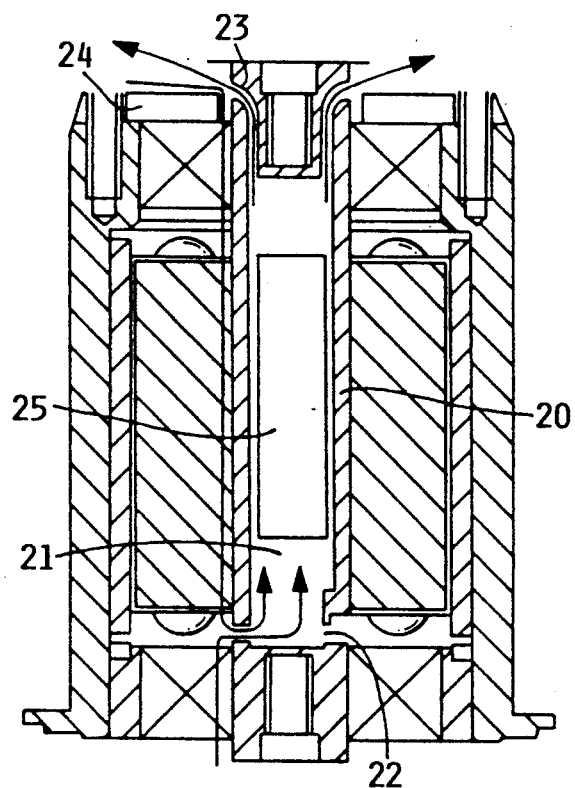
FIG. 3 is a cross sectional view of a hub assembly of the present invention comprising a ventilated spindle and a fan.

FIG. 3 shows a hub assembly 6 in accordance with the present invention. The hub assembly 6 of the present invention incorporates a ventilated spindle 20 having an internal air passage 21. Air is admitted to the air passage from the interior of the hub assembly through a ring of lower ventilation holes 22 positioned above the lower bearing and therefore inside the hub assembly. Air is expelled from the air passage into the disk container through a ring of upper ventilation holes 23 positioned above the upper bearing and therefore outside the hub assembly. Therefore, the air passage completes an air path between the interior of the hub assembly and the disk container via the spindle. The air passage offers a resistance to the air flowing from the hub assembly into the disk container which is substantially less than that offered by the upper bearing.

The lower flow resistance provided by the air passage is in parallel with the higher flow resistance provided by the upper bearing. Therefore, the airflow through the upper bearing can now be conveniently reversed by application of excess back pressure. Such back pressure is generated by a fan 24 which is fixed to the top of the hub assembly. The fan rotates with the hub assembly causing the back pressure to be generated across the upper bearing. The back pressure reverses the air flow through the upper bearing so that it now flows from the disk container into the hub assembly rather than from the hub assembly into the disk container. Air flowing through both the upper and lower bearings from the disk container now passes into the air passage through the lower ventilation holes. Contaminants carried into the air passage by air flowing, or by diffusion from the hub assembly are removed by a filter 25 placed in the air passage. The filter may suitably contain material for trapping bearing particles and an active carbon element for trapping vapours. Air flowing from the air passage into the disk container through the upper ventilation holes may therefore be freed of contaminants.

Figure 4:
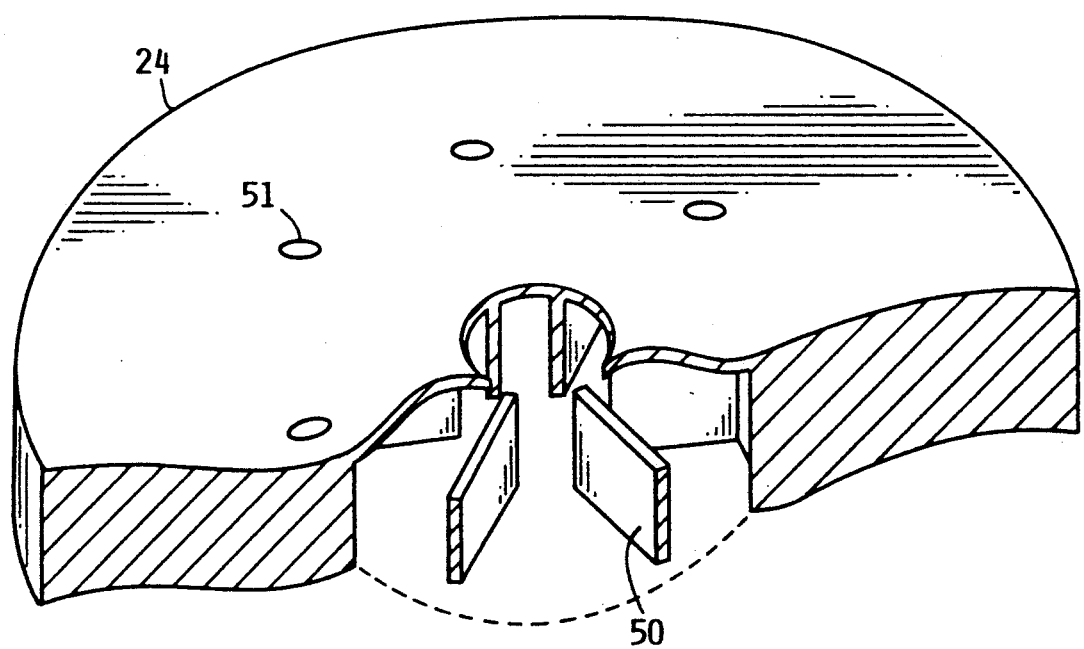
FIG. 4 is a perspective drawing indicating blade orientation of the fan.

FIG. 4 indicates a possible blade orientation 50 of the fan. In operation, the blade orientation enables the fan to provide enough back pressure to reverse the air flow through the upper bearing but not enough back pressure to blow air from the hub assembly into the disk container through the lower bearing. It will however be appreciated that the use of other blade orientations would provide equally desirable results. The fan is mounted on the hub assembly using mounting holes 51 receptive to screws used to attach the disk clamp to the hub assembly. Indeed, for simplicity of manufacture, the fan may be constituted by features machined or stamped into the disk clamp.

Figure 5:
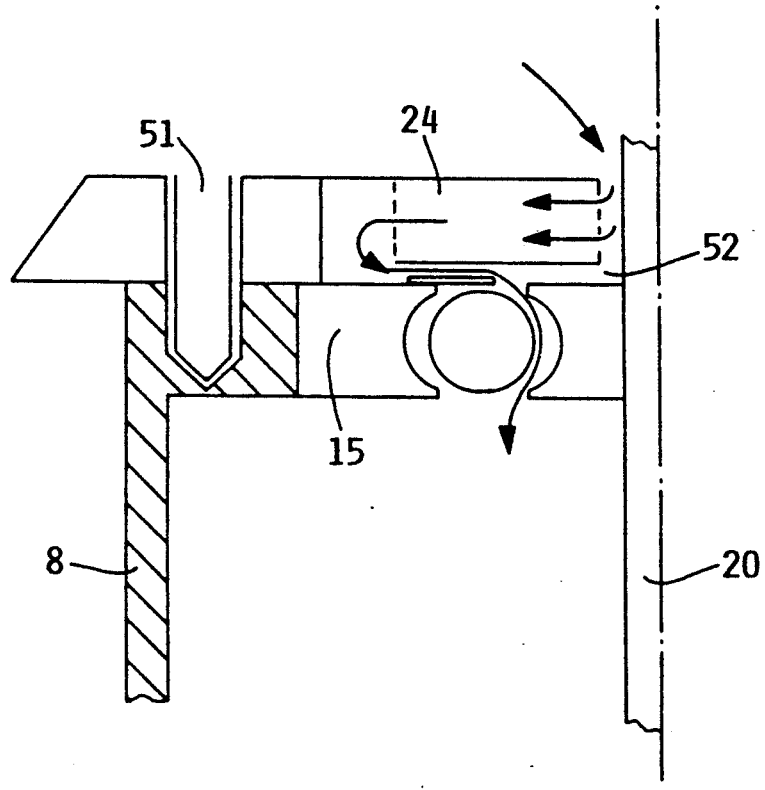
FIG. 5 is a magnified view of the fan mounted on the hub assembly of the present invention.

FIG. 5 shows the air flow generated by the fan flowing from the disk container into the hub assembly through an annular gap 52 between the inner diameter of the fan and the spindle.

Figure 6:
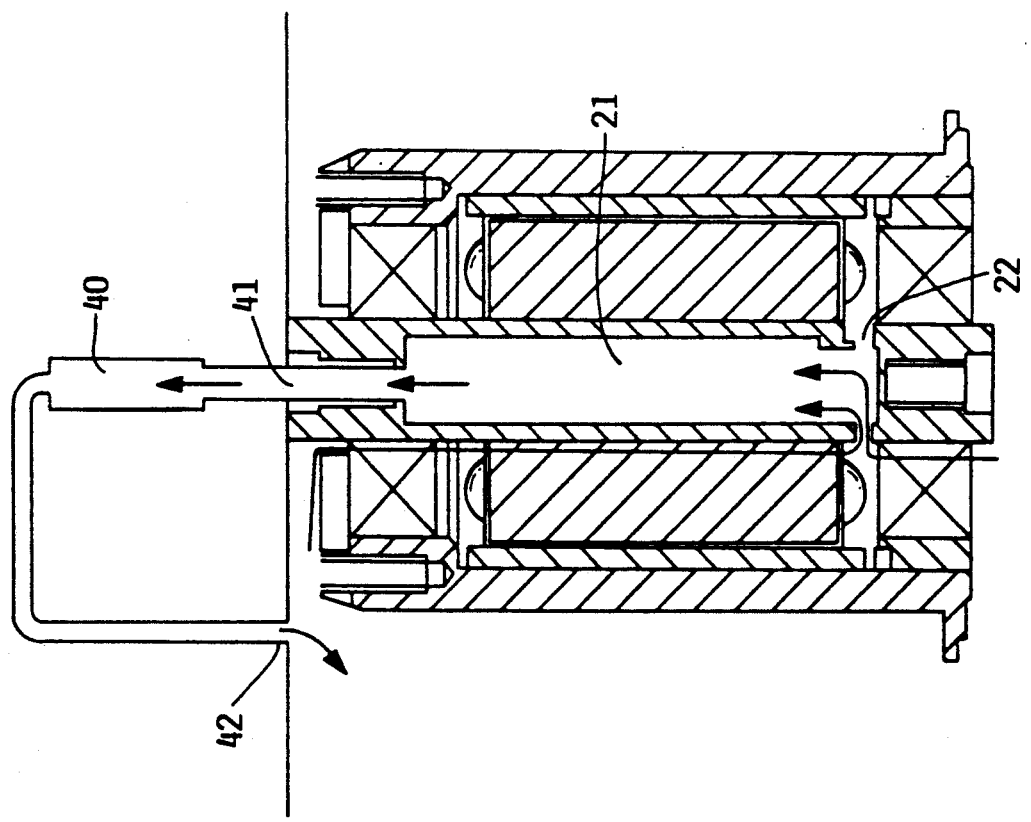
FIG. 6 is a cross sectional view of a hub assembly of the present invention comprising a ventilated spindle, a fan and an external filter container.

In another example of the present invention shown in FIG. 6, the filter is placed in an external container 40 which is connected to air flowing from the lower ventilation holes 22 into the air passage 21 by an inlet tube 41 through an upper spindle clamping screw. Air is expelled from the container into the disk container through an outlet tube 42. This embodiment of the present invention is particularly applicable to a sealed disk file comprising small diameter disks (such as 5 cm disks) and a spindle which is therefore too small to accommodate a filter.

Figure 7:
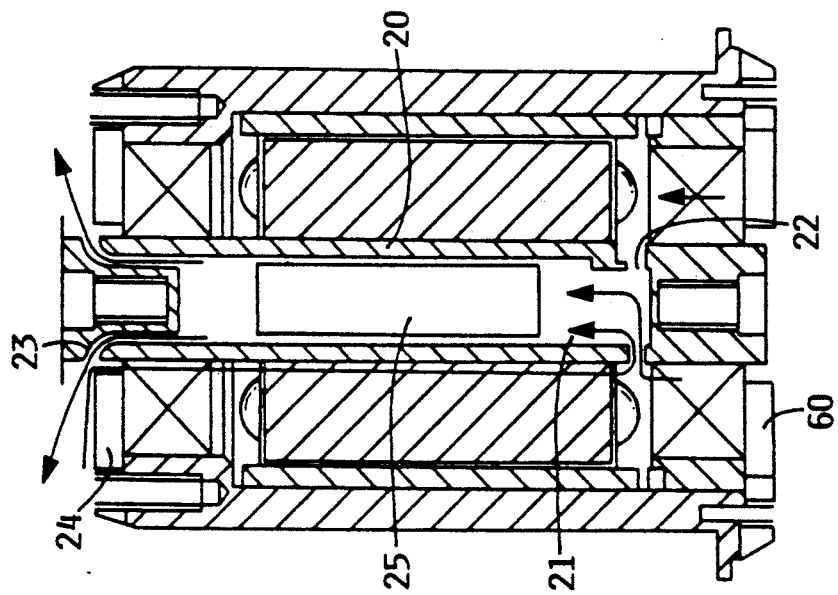
FIG. 7 is a cross sectional view of a hub assembly of the present invention comprising a ventilated spindle and two fans.

The particular examples of the present invention hereinbefore described rely on a pressure difference between the top and bottom of the hub assembly to cause an air flow through the lower bearing into the hub assembly when the disk file is in operation. When no such natural pressure difference exists, airborne contaminants generated during rotation of the hub assembly, diffusion of contaminants from the hub assembly into the disk container is prevented in yet another example of the present invention which is illustrated in FIG. 7. In this example, a second fan 60 generates an air flow from the disk container into the hub assembly through the lower bearing. As described in the preceding paragraphs, a first fan 24 causes air to flow from the disk container into the upper bearing. Air escapes from the hub assembly into the air passage 21 in the spindle 20 whereupon airborne contaminants can be removed by the filters hereinbefore described.

I claim:

1. A disk file having a container (3) for a hub assembly (6) comprising
    a stationary spindle (9) attached to the container;
    a clamp (13) for mounting a disk (11) on a hub (8);
    bearing means (14, 15), comprising a first bearing (14) located towards one end of the hub (8) and a second bearing (15) located towards the other end of the hub, for rotatably mounting the hub (8) on the spindle (9);
    characterised in that the hub assembly (6) further comprises ventilation means (21, 22, 23) for directing an air flow into the hub assembly (6) through the bearing means (14, 15) and out of the hub assembly (6) into the container (3) through a connecting air passage (21) located in the spindle (9) permitting the air to flow through said ventilation means; and
    a filter located within said ventilation means for filtering said air.

2. A disk file as claimed in claim 1 wherein the ventilation means comprises a ventilated spindle (20) having a first ventilation duct (22) extending from the hub assembly into the air passage, and a second ventilation duct (23) extending from the air passage into the container.

3. A disk file as claimed in claim 2 wherein the ventilation means further comprises a first fan (24), mounted on the hub assembly, for directing an air flow through the first bearing into the hub assembly.

4. A disk file as claimed in claim 1 wherein the filter includes an active carbon element.

5. A disk file as claimed in claim 1 wherein the filter (25) is located within the connecting air passage located in the spindle.

6. A disk file as claimed i claim 1 wherein the ventilation means further comprises a separate compartment

(40) connected to the connecting air passage within the spindle by an inlet duct (41) and, said separate compartment, connected to the container by an outlet duct (42), said filter for filtering air located within said separate compartment.

7. A disk file as claimed in claim 1 wherein the ventilation means comprises a ventilated spindle (20) having first ventilation ducts (22) located adjacent tot he first bearing and extending from the hub assembly into the connecting air passage, and second ventilation ducts (23) located adjacent to the second bearing and extending from the connecting air passage into the container.

8. A disk file as claimed in claim 1 wherein the ventilation means further comprises a first fan (24), mounted on the hub assembly, for directing an air flow through the first bearing into the hub assembly.

9. A disk file as claimed in claim 8 wherein the first fan is an integral portion of the clamp.

10. A disk file as claimed in claim 8 wherein the ventilation means further comprises a second fan (60), mounted on the hub assembly, for generating an air flow from the container into the hub assembly through the second bearing.

11. A disk drive apparatus comprising:
a disk container;
at least one disk within said disk container;
a hub assembly further comprising:
a spindle having a first end and a second end, said spindle attached to said disk container, said spindle including an internal air passage and including a first opening near said first end and a second opening near said second end, both of said first and second openings in fluid communication with said internal air passage and in fluid communication with said disk container; and
a hub attached to said spindle so that the hub rotates about the spindle assembly having said
at least one disk attached to said hub of said hub assembly; and
an actuator assembly attached to said disk container, said actuator assembly further comprising:
an actuator shaft attached to said disk container;
an arm assembly attached to said actuator shaft so that the arm assembly rotates about said actuator shaft; and
a read/write head attached to said arm assembly so that the read/write head is passed over the surface of the disk during rotation.

12. The disk drive of claim 11 further comprising a fan attached at one of the first or second ends of the hub assembly.

13. The disk drive of claim 12 further comprising a fan attached at the other of the first or second ends of the hub assembly.

14. The disk drive apparatus of claim 10 wherein said spindle includes a filter within said internal air passage.

15. The disk drive apparatus of claim 11 further comprising:
a filter container in fluid communication with said first opening and said disk container; and
a filter within said filter container.

* * * * *